Reissued Jan. 25, 1938

Re. 20,635

UNITED STATES PATENT OFFICE 20,635

PROCESS FOR TREATMENT OF YEAST AND THE PRODUCT PRODUCED THEREBY

Curtis P. Freshel, New York, N. Y., assignor to Bakon Yeast, Inc., New York, N. Y., a corporation of New York No Drawing. Original No. 1,981,225, dated November 20, 1934, Serial No. 651,851, January 14, 1933. Application for reissue November 18, 1936, Serial No. 111,403

7 Claims. (Cl. 99—96)

My invention relates to processes for the treatment of yeast and refers particularly to processes for the treatment of yeast whereby its natural taste will be concealed, or changed, and the products produced by said processes.

Yeast has now come to hold an important place as a food, accessory or supplemental food in order to obtain a more nearly balanced diet, particularly under conditions of lack of sufficient available sunshine, the yeast supplying necessary vitamines, as well as also contributing further valuable effects in its cleansing and regulative action throughout the digestive tract, and upon the entire system in general, including the promotion of the clear functioning of the brain in its mental activity. These desirable properties and effects of yeast as an article of diet are now generally recognized by the medical profession, as well as largely and increasingly by people in general. One serious impediment or drawback to the more general use of yeast has been that, for some not well understood reason, there are a great many people who do not like the taste of yeast, whether eaten in its usual cake form, or dissolved in warm water, milk, or other liquid.

Attempts have heretofore been made to find a satisfactory solution of this problem. Commonly the yeast has been intermixed with some other food product having a more pronounced taste thought to be more popular, in an effort thus to disguise, or overcome, the natural taste of the yeast with a different more generally agreeable predominating taste, so that thereby the yeast taste would not be recognized. These attempts have neither been entirely technically successful nor, for that and other reasons, have they proved to be wholly, or generally, acceptable to that large portion of the public who recognize and desire to avail themselves of the advantages of yeast in their diet.

In the instance of many such mixtures the taste of the yeast is not suppressed, nor overcome, but blends with the taste of the food product mixed therewith to produce a different new taste which is frequently unpleasant. People commonly desire yeast only, without being compelled to eat some other undesired substance in order to obtain it, such other substance usually being of greater bulk in the mixture than the yeast. Should the mixture have a large sugar content, as is the case with some candy mixtures and the like, the result in many instances may be a harmful excess intake of sugar, particularly in the case of middle-aged or older people, as well as others on a prescribed diet, and all of whom would be benefited by yeast. Also such yeast mixtures are commonly expensive to an extent that they do not prove to be economical.

My invention overcomes all of these above noted difficulties and objections while at the same time attaining all of the advantages of the consumption of yeast alone. The product of my invention provides greater convenience of use of yeast than heretofore. Also by my invention there is produced a product which will remain permanently, or indefinitely, in unimpaired usable condition, as an article of commerce and also in the home of the consumer. Other desirable aspects and advantages of my invention will hereinafter appear.

In accordance with my invention, a modifying agent or medium is employed by which the yeast is impregnated with a flavor, without the mixing of any tangible substance therewith. Moreover, the flavor employed in carrying out my invention is one which imparts to the yeast a taste which is universally liked, while no taste of the original yeast is to be detected in the yeast product of my invention.

According to one desirable way of carrying out my invention, the product may be aptly designated as "smoked yeast". Thus in carrying out the process of my invention, yeast may be subjected to the smoke fumes produced by burning hickory wood. The yeast when subjected to such treatment is in a dry dehydrated, or desiccated condition. Also, it is in a finely comminuted condition, either in the form of a powder or finely granulated into small particles. While the results produced by employing hickory wood for this purpose have proved in all respects highly desirable, other materials, or substances, may be utilized, some of which are hereinafter noted.

I have found that, under suitable conditions provided in carrying out my invention, the smoke fumes can be caused thoroughly to permeate the yeast and impregnate it with a pronounced distinctively delicious flavor. The taste of the product of my invention is very pleasant, slightly pungent, and closely resembles that of smoked bacon. Excepting alone this flavor which has been imparted thereto, such final product contains nothing but yeast, the desirable qualities and action of which as an article of diet remain entirely unimpaired.

Moreover, I have found that this flavor, together with the acceptable taste produced thereby in the yeast, is permanently retained by the yeast under all ordinary or usual conditions.

The final product of my invention is in a dry finely granulated or powder form, of light brown color. In addition to other uses, it is especially adaptable as a condiment, and may be dispensed from a shaker, in the same way, for example, as pepper and salt. It can be thus used upon a large variety of foods, with no taste of yeast, but only of the flavor which agreeably blends with that of the food to which such treated yeast has been applied or with which it has been mixed. For example, it will contribute an agreeable smoked bacon flavor to eggs.

This product of my invention is capable of extensive and substantially unlimited use as a flavoring material for many kinds of foods prepared in various different ways. The full benefits of the use of yeast in the diet may be thus obtained in a convenient and economical manner. Thus it will be manifest that the process and product of my invention have numerous advantages.

In the process of preparing the flavored yeast powder in accordance with my invention, the yeast itself is made use of in a finely comminuted or substantially pulverulent desiccated form. The yeast may be initially reduced to this dry pulverized condition by any suitable preliminary or preparatory process, such as are well known and commonly practiced for various more or less physically similar materials, and which therefore need not be particularly described here. The smoking part of the process, however, according to my invention, should be carried out in a particular manner in order to obtain the best and entirely satisfactory results, although these subsequent steps in the process are capable of variation in some respects. In any case, it is important that the largest possible surface area of the yeast shall be exposed to the smoke fumes, and in all respects conditions should be as favorable as possible for the uniformly thorough absorption of these flavoring smoke fumes by the yeast.

One desirable process, together with some variations and modifications therein, for effectively carrying out my invention in a practical manner, will now be particularly described.

A container which is capable of being hermetically sealed is provided. The size of this container is dependent upon the quantity of yeast it is desired to treat at one time. It may advantageously be more or less of tower form. The powdered dry yeast, while under treatment, may be dropped in a shower, like falling snow, down through such a tower-like container. This feature of operation may be repeated as many times as may be found to be necessary for obtaining the desired final result. This manner of subjecting the yeast to treatment, in a freely loosely falling separated, or segregated, and thus fully exposed, condition of its individual particles, may be readily accomplished by means of mechanical devices which are similarly used for other purposes, such, for example, as in drying undue moisture from wheat and other cereal grains, as well as also in subjecting various crushed or more or less comminuted ores to a roasting or other process of treatment. Thus it is unncessary to burden this specification with a description of such machinery. An arrangement such as above noted would be particularly suitable for production on a large commercial scale.

A simpler manner of effecting substantially similar results has been found to be practically workable. According to this latter arrangement or manner of procedure, the dry powdered yeast is subjected to its entire treatment, in carrying out the process of my invention, while disposed in a thin film-like layer upon respective shelves or ledges arranged within the container. A large yeast-holding capacity may be thus provided. In this case, it is only necessary to continue the steps of the treating process for the sufficient length of time found to be required for producing the desired final results. It will be appreciated that such a thin layer provides a proportionally very large surface exposure and that only slight penetration or permeation will be necessary for securing a uniformly treated product as to all of its minute particles.

Before and preparatory to the impregnation of the yeast with the smoke flavor, it is desirable that it be subjected to more or less of a vacuum, thereby to withdraw or extract air from among and from within its particles, thus both augmenting its absorptive power and increasing its capacity for taking up and holding the flavor. Accordingly, for a sufficient time period, the air is partially or substantially completely exhausted from the container with the yeast exposed therein. Also, as a consequence of such vacuumizing of the yeast, less time will be required for it to become thoroughly permeated and impregnated with the smoke flavor. However, it has been found that, for further simplification of the process of my invention, this vacuumizing, though advantageous on the whole, may be omitted and good results still secured in the quality of the final product.

In subjecting the yeast to the smoke fumes, a smoldering fire of hickory wood is burned in the lower part of the container, or the smoke fumes may be otherwise directly admitted thereto. Only enough air should be admitted, directly to the fire, to sustain such smoldering combustion as is desired, care being exercised in this respect, particularly in view of the vacuumizing. As soon as the container is well filled with the smoke fumes it may be entirely closed or sealed, and may be left in this condition until the smoke flavor has had ample opportunity thoroughly to permeate and impregnate the yeast, which may be several hours, or half a day, or longer, or over night, such period of time being readily determined in practice.

While it is not known just why, nor how, the substance of the yeast is enabled to absorb and incorporate within itself the smoky flavor, particularly in such manner as to provide an exceedingly pleasant and attractive taste, and even further that this taste thus imparted to the yeast should bear a close resemblance to the taste of smoked bacon, it is known by actual practice of my invention that such is the case. Thus it becomes clearly evident that the treated yeast forming the product of my invention, to be produced by the process of my invention, has great utility and is of substantial public value.

Among other materials and substances, besides hickory wood, which I have found may be made use of for effectively carrying out my invention, there may be mentioned oak, maple, and apple wood; also coffee, chocolate, cinnamon, maple extract, and vanilla.

I do not limit myself to particular details of the process of composition of the product of my invention as above described, as these are given simply as a means for clearly describing my invention, and various modifications may be made within the principle and scope of my invention as defined in the appended claims.

I claim:

1. The process of treating dry powdered yeast, which comprises exposing a relatively large surface area of dry powdered yeast to smoke whereby flavor-giving substances are absorbed by said yeast from said smoke, said flavor-giving substances being dominant over the natural flavor-giving substances of said yeast.

2. The process of treating dry powdered yeast which comprises causing dry powdered yeast to absorb and become impregnated with smoke of a nature that will mask the natural flavor of the yeast while leaving it free from any other commonly undesirable flavor.

3. The process of treating dry powdered yeast which comprises causing dry powdered yeast to absorb and become impregnated with smoke of a nature which will eliminate the natural taste of the yeast and be capable of imparting to the yeast an acceptable taste which has no resemblance to the natural taste of yeast.

4. The process of treating dry granulated or powdered yeast which comprises exposing a large surface area of dry granulated or powdered yeast to the smoke from burning wood, said wood being of the type which produces smoke having desirable flavoring characteristics.

5. As a new article of manufacture, edible dry powdered yeast having a desirable smoky taste which masks the taste of the yeast itself.

6. As a new article of manufacture, a dry powdered condiment comprising dry powdered yeast having a desirable smoky taste to the exclusion of the taste of the yeast itself.

7. As a new article of manufacture, an edible dry granulated or powdered yeast containing flavoring matter having the characteristics of smoke, said flavoring matter being effective to dominate the natural flavoring matter of the yeast.

CURTIS P. FRESHEL.